W. H. WILKINSON.
LOGOTYPE
No. 106,641.　　　　　　　　　　　Patented Aug. 23, 1870.
Fig. 2.　　　Fig. 1.　　　Fig. 3.
 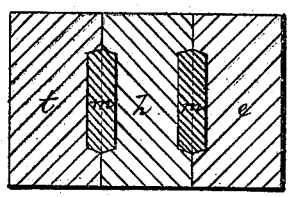 
Fig. 4.
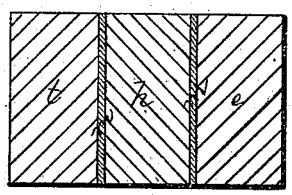
Fig. 6.　　　Fig. 5.　　　Fig. 7.
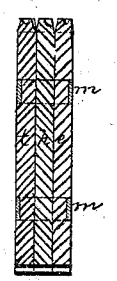 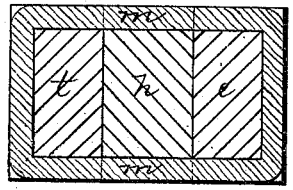 
Fig. 8.
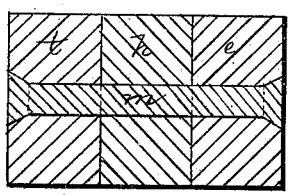
Fig. 9.
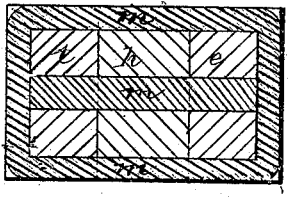
Witnesses.　　　　　　　　　　　Inventor.

UNITED STATES PATENT OFFICE.

WILLIAM H. WILKINSON, OF SOUTHWICK, MASSACHUSETTS

IMPROVEMENT IN LOGOTYPES.

Specification forming part of Letters Patent No. 106,641, dated August 23, 1870; antedated August 12, 1870.

*To all whom it may concern:*

Be it known that I, WILLIAM H. WILKINSON, of Southwick, in the county of Hampden and State of Massachusetts, have invented certain new and useful Improvements in Combined Types for Printing; and I do hereby declare that the following is a full and exact description thereof.

The invention is intended to apply to any system or method of composition by letter-types. It will apply also to combinations of separate types or parts for producing figured border, rule-work, and other impressions, of any style or for any purpose.

I will describe it as applied to ordinary letter-types.

I have devised a system of combining and arranging types which deals mainly with the words and roots, and other combinations, such as constitute a very large proportion of the matter in ordinary English composition.

These words and combinations are classified and tabulated according to their grammatical functions, relations, and sequences, and are arranged in cases according to their relative importance, as measured by their frequency of recurrence—that is to say, each table of words occupying a position in the cases made conveniently accessible to the right hand of the compositor, and near to a central position in proportion to the number of words and combinations usually contributed by said table, to form the matter in composition.

My present invention consists in the use of india-rubber or other elastic material to combine or unite the separate types with sufficient firmness for the ordinary usage of composition and distribution, and yet allowing them to yield a little, and, in certain special provisions, for rendering such a union more effectual.

The material for properly joining the types must be elastic, and must be capable of enduring water and strong lye, and also of enduring the heat employed in the stereotyping process. I find that rubber can be made to fulfill all these conditions.

When rubber dissolved in naphtha, or analogous solvent, is employed in connection with type of ordinary material, there is a high degree of adhesion between the gum and the metal; and I have experimented with much success with a solution of india-rubber applied to the plane sides of the types to be united, and by simply laying properly together the types so smeared on their inner sides. One mode of increasing the body or mass of the elastic material interposed, so as to increase the flexibility, is to groove longitudinally the sides of the body of the types, which groove, being filled with the elastic material, either with or without being perforated or nicked around, as will be described, contributes to the good effect.

I can employ the elastic material in the form of a jacket or band, or employ several bands or strips, the said bands inclosing and holding together the types arranged side by side, and the said types being each nicked on both their front and back edges, and the initial and final letter of each combination being also nicked or grooved across with a shallow groove upon their outer sides, so as to form, when placed together, continuous depressions or grooves, extending quite around the combination of letters. These grooves may receive the bands in sufficient strength to hold the types properly together without causing the bands to project beyond the ordinary outer lines of the bodies of the type.

Another mode of construction may be to perforate each type to admit of a core of the elastic material extending through the combination of letters. In such case I countersink the holes in the outer face of the initial and final letters, and thus form a head, so to speak, to the core.

Another construction is to both nick around and perforate, so that there shall be a band extending around, as first referred to, and also a hole extending through.

I prefer, so far as convenient, a solution of india-rubber or analogous elastic material, applied so as to render available both the adhesion of the entire surfaces of the several types in contact, as last described, and also the increased strength and flexibility due to the employment of the same or other elastic material extending around and through the several types. The nicks or cavities may be produced in the act of casting the types, or, when occasion requires it, they may be made by any suitable slight machine, or by a file or other ordinary tool.

Among the advantages secured by this method of combining types are the high degree of ease and rapidity with which the word-types may be formed at will, the combinations being effected by the printer or by children employed in his establishment, or by any workmen or women, at times when they might otherwise be idle. The elasticity of the connection also allows the types to be formed without the care and skill that would be required by any previously-known method. They may be made sufficiently even and true in line and face by simply resting them in proper position on a flat surface, with their faces against a straight edge, and allowing the rubber to harden in such position.

One very important advantage due to the elasticity of the connection is found in the capacity it affords for the type to yield a little. Thus, when in consequence of any of the very common causes the type are slightly "off their feet" or otherwise distorted, the several individual types, in the word-types or combinations, will yield and act about like ordinary separate types. In short, my word-type forms a body sufficiently pliable and susceptible to the usual appliances for squaring, tightening, and planing down when standing in the matter in composition.

Another great advantage lies in the ease with which any damaged or defective letter may be removed, and the word-type made good by the substitution of perfect letters, as required.

Another advantage lies in the adaptation of my invention to utilize the previously-acquired stock of type in the hands of the printer. Most printers have a large quantity of type in stock which is only partially worn out, and it involves a very great expense to substitute new type therefor, and the mingling of new type with old is objectionable for very well known reasons; also, in the facility it affords for getting back the types to be used separately again by dissolving off the rubber when such change is desired. The advantages to be derived from the use of combinations of letters in word-types and in parts of words are too obvious to require enumeration.

The accompanying drawing forms a part of this specification.

Figures 1, 4, 5, 8, and 9 are cross-sections of my compound types made in different styles, but all containing one or both of the new features which I claim as my invention.

The remaining figures are on a smaller scale, but still magnified.

All these other figures are longitudinal sections. The figures will be readily understood by mechanics and printers.

Similar letters of reference indicate corresponding parts in all the figures.

In all, $t\ h\ e$ are the metal portions of the several individual types. Their faces may correspond with this lettering, so that the word-type may produce the word "the." In each the rubber is represented by $m$.

I claim—

1. The employment of two or more individual types of type metal or analogous hard material united by rubber, substantially as herein specified.

2. The within-described construction of compound types, of two or more individual types, with the within-described cavities extending around or through the bodies, when used in combination with an elastic material, $m$, which fills the cavities and connects the bodies strongly together, as herein specified.

In testimony whereof I have hereunto set my name in presence of two subscribing witnesses.

W. H. WILKINSON.

Witnesses:
  WM. C. DEY,
  A. HOERMANN.